United States Patent
Polak (10) Patent No.: US 11,438,488 B2
(45) Date of Patent: Sep. 6, 2022

(54) OPTICAL DEVICE AND METHOD OF MANUFACTURING THE SAME

(71) Applicant: Aptiv Technologies Limited, St. Michael (BB)

(72) Inventor: Andrzej Polak, Huerth (DE)

(73) Assignee: Aptiv Technologies Limited, St. Michael (BB)

( * ) Notice: Subject to any disclaimer, the term of this patent is extended or adjusted under 35 U.S.C. 154(b) by 2 days.

(21) Appl. No.: 17/184,494

(22) Filed: Feb. 24, 2021

(65) Prior Publication Data

US 2021/0274077 A1 Sep. 2, 2021

(30) Foreign Application Priority Data

Feb. 27, 2020 (EP) ..................................... 20159917

(51) Int. Cl.
*H04N 5/225* (2006.01)
*G02B 7/02* (2021.01)
(Continued)

(52) U.S. Cl.
CPC ......... *H04N 5/22521* (2018.08); *B29C 45/16* (2013.01); *G02B 7/021* (2013.01);
(Continued)

(58) Field of Classification Search
CPC ............. H04N 5/22521; H04N 5/2254; H04N 5/2257; B29C 45/16; G02B 7/021;
(Continued)

(56) References Cited

U.S. PATENT DOCUMENTS 7,988,371 B2    8/2011   Aoki et al.
2010/0001071 A1 1/2010   Ohara et al.
(Continued)

FOREIGN PATENT DOCUMENTS

DE    102008047277    4/2010
EP        2942938    11/2015
(Continued)

OTHER PUBLICATIONS

"Extended European Search Report", EP Application No. 20159917.2, dated Nov. 13, 2020, 14 pages.
(Continued)

*Primary Examiner* — Abdelaaziz Tissire
(74) *Attorney, Agent, or Firm* — Sawtooth Patent Group PLLC (57) ABSTRACT

An optical device comprising a lens barrel part housing one or more lens elements and comprising a first coupling formation. A support part is provided comprising a second coupling formation mechanically mated with the first for supporting the lens barrel part in front of an optical sensor. The first and second coupling formations are mated at a connection plane. At least a rear portion of the lens barrel part extends rearward from the connection plane such that at least one lens element is located between the connection plane and the optical sensor. Forward movement of the (Continued)

connection plane caused by thermal expansion of the support part is compensated by rearward thermal expansion of the rear portion for maintaining the image plane substantially coincident with the sensitivity plane.

20 Claims, 4 Drawing Sheets

(51) Int. Cl.
    *B29C 45/16*     (2006.01)
    *B29L 11/00*     (2006.01)

(52) U.S. Cl.
    CPC .......... *G02B 7/028* (2013.01); *H04N 5/2254* (2013.01); *B29L 2011/0016* (2013.01); *H04N 5/2257* (2013.01)

(58) Field of Classification Search
    CPC ........ G02B 7/028; G02B 7/022; G02B 13/16; B29L 2011/0016
    See application file for complete search history.

(56) References Cited

U.S. PATENT DOCUMENTS

| | | | | |
|---|---|---|---|---|
| 2011/0043687 | A1* | 2/2011 | Chang | H01L 27/14618 348/374 |
| 2011/0242407 | A1* | 10/2011 | Lee | H04N 5/2254 348/374 |
| 2014/0063265 | A1* | 3/2014 | Shukla | H04N 5/2257 348/374 |
| 2016/0097912 | A1* | 4/2016 | Kobori | G02B 7/028 359/820 |
| 2016/0161701 | A1* | 6/2016 | Takama | G02B 7/028 359/754 |

FOREIGN PATENT DOCUMENTS

| | | |
|---|---|---|
| EP | 3042229 | 7/2016 |
| EP | 3226535 | 10/2017 |
| EP | 3280127 | 2/2018 |
| EP | 3290979 | 3/2018 |
| EP | 2703862 | 6/2019 |
| EP | 3438721 | 7/2020 |
| JP | 2002014269 | 1/2002 |
| JP | 2006270939 | 10/2006 |
| JP | 5274881 | 8/2013 |
| JP | 2019113753 | 7/2019 |
| KR | 20160104313 | 9/2016 |
| WO | 200531423 | 4/2005 |
| WO | 2017138698 | 8/2017 |
| WO | 2019098085 | 12/2020 |

OTHER PUBLICATIONS

"Partial European Search Report", EP Application No. 20159917.2, dated Aug. 13, 2020, 16 pages.

* cited by examiner

OPTICAL DEVICE AND METHOD OF MANUFACTURING THE SAME

CROSS-REFERENCE TO RELATED APPLICATION

This application claims priority to European Patent Application Number 20159917.2, filed Feb. 27, 2020, the disclosure of which is hereby incorporated by reference in its entirety herein.

BACKGROUND

The present disclosure relates to an optical device, such as a lens holder or a camera module incorporating a lens holder. The present disclosure is particularly suited to camera modules for the automotive industry.

Automotive camera modules are exposed to temperatures varying over a large range (typically −40° C. to +105° C.) and are required to have excellent imaging performance over the whole operating temperature range. For this reason, the materials, shapes and relative positions of components of the lens holder assembly is designed to keep the lens image plane, defined by the lens stack's back focal length, in or as close as possible to the sensitive plane of the imager throughout the operating temperature range.

The difficulty with maintaining the position of the lens image plane is that the lens holder support, lens barrel, the optical lens elements, and the glue and spacers within the assembly all expand and shrink with changes in temperature. As such, the distance between lens image plane and the imager located on a PCB increases or decreases along the optical axis resulting in the degradation of the camera's performance.

At the same time as the above, demands in the automotive sector have also meant there is a growing need for cameras with even greater image quality, a larger field of view, and a greater depth of field. However, to meet these demands, the distance between the lens image plane and the imager's sensitivity plane needs to change no more than a few micrometers over the entire operating temperature range of the camera module. As such, providing a robust solution that will ensure stable focus over a large temperature range remains a major challenge in the automotive sector.

Various conventional devices have attempted to address the above issues. For example, EP3042229 and DE102008047277 both disclose arrangements in which the forward expansion of the lens holder away from the imager is compensated by a compensating element which expands in the opposite direction. However, such designs are significantly more complex and introduce additional manufacturing costs. For example, the additional steps required to align and glue the compensation components has meant that such lens assemblies have been prohibitively expensive for commercial applications.

SUMMARY

The present disclosure therefore concerns a simple camera module which can achieve precise and accurate focus over a wide operating temperature range.

According to a first aspect, there is provided an optical device comprising: a lens barrel part housing one or more lens elements arranged along an optical axis for focussing an image onto an image plane, the lens barrel part comprising a first coupling formation; and a support part comprising a second coupling formation mechanically mated with the first coupling formation for supporting the lens barrel part in front of an optical sensor having a sensitivity plane perpendicular to the optical axis, the first and second coupling formations being mechanically mated at a connection plane parallel to the sensitivity plane, wherein at least a rear portion of the lens barrel part extends rearward from the connection plane such that at least one lens element is located between the connection plane and the optical sensor, and wherein forward movement of the connection plane caused by thermal expansion of the support part is compensated by rearward thermal expansion of the rear portion of the lens barrel part for maintaining the image plane substantially coincident with the sensitivity plane.

In this way an optical device is provided in which the rear portion of the lens barrel itself is able to compensate for the thermal expansion of the supporting part. That is, as the supporting part expands with heat, the connection plane in which the support part connects with the lens barrel is advanced distally away from the optical sensor at the rear. This would otherwise move the image plane a corresponding distance forward along the optical axis, such that the image would be focussed in a plane which is in front of the sensitivity plane of the optical sensor. However, with embodiments this may be compensated by the rearward movement of at least the rearmost lens element housed within the rear portion of the lens barrel part. In embodiments, the optical characteristics of one or more of the lens elements may also be configured to work in combination with the rearward movement of the rear portion of the lens barrel part to compensate for the expansion of the support parts.

Importantly, with embodiments, thermal compensation is achieved by the lens barrel part rather than providing a separate compensation component. Consequently, there is no need to undertake separate gluing and alignment operations during manufacture in order to position and secure these components. That is, embodiments may provide the same advantages of a unibody lens holder design in that only a single glue and alignment step is necessary, with this being at the stage of securing the support part to the PCB. At the same time, a camera module with a high optical performance across a broad operating temperature range can be provided because the image plane is maintained substantially coincident with the sensitivity plane. That is, for example, the image plane may be kept within 10 micrometers of the sensitivity plane across the whole of the operating temperature range.

In embodiments, one of the first and second coupling formations comprises a projection and the other of the first and second coupling formations comprises a recess for receiving the projection. As such, the first and second coupling formations mechanically interengage with one another for connecting the support and lens barrel parts, thereby providing a stable connection.

In embodiments, the first coupling formation comprises the projection and the second coupling formation comprises the recess.

In embodiments, the one of the first and second coupling formations comprising the projection comprises two or more projections extending laterally from the optical axis and the other of the first and second coupling formations comprising the recess comprises two or more slots for receiving the two or more projections, respectively. In this way, an even more compact optical device assembly may be provided by reducing the circumferential regions in which the projection and corresponding recesses are provided. That is, the coupling formations do not need to extend around the entire circumference of the lens barrel. In embodiments, two or three projections and corresponding slots are provided.

In embodiments, the lens barrel part is formed of a first polymer material and the support part is formed of a second, different, polymer material. In this way, the composition of the two parts making up the lens holder may be selected to avoid binding to each other. As such, whilst the first and second coupling formations are mechanically mated to form a firm connection, other surfaces of the lens barrel and support parts which may abut against each other are nevertheless able to slide relative to one another. Advantageously, this may allow one of the lens barrel and support parts to be formed around the other, whilst mitigating the risk of unwanted bonding between surfaces that are merely in contact with one another.

In embodiments, the lens barrel part is coaxial with a bore in the support part, and wherein the thermal expansion of the rear portion of the lens barrel is rearward within the bore.

In embodiments, the optical device further comprises the optical sensor, wherein the optical sensor is an imager provided on a printed circuit board, PCB, and the support part is mounted to the PCB.

In embodiments, the one or more lens elements comprise a plurality of lens elements. In this way, the lens elements may be provided in a lens stack.

In embodiments, a front portion of the lens barrel part extends forwards from the connection plane, and wherein the rearward thermal expansion of the rear portion of the lens barrel part further compensates for the forward movement of any of the plurality of lenses housed within the front portion. In this way, a range of lens stacks may be accommodated to achieve variety of optical characteristics, whilst still allowing for thermal expansion compensation.

In embodiments, one of the lens barrel part and the support part comprises a front facing channel for location adjacent to a window located in front of the lens barrel part. In this way, the front face of the camera module may include cross-talk prevention means to prevent reflected light from an adjacent illumination source from compromising the sensed camera image. The window may be, for example, an infrared window.

In embodiments, the front facing channel comprises a surface perpendicular to reflectived light from the window. In this way, the perpendicular surface may absorb reflected light or reflect the light back into the window so as to prevent onward transmission to the optical sensor. In embodiments, the front facing channel may be a v-shaped channel.

In embodiments, the lens barrel part is formed of a material with a first thermal expansion coefficient and the support part is formed of a second material with a second, different, thermal expansion coefficient. In this way, differences in the relative sizes of the parts may be compensated by selecting materials with suitable thermal expansion coefficients. In embodiments, the thermal expansion coefficient of the material used for the lens barrel part may be higher than the thermal expansion coefficient of the material used for the support part.

According to a second aspect, there is provided a method of manufacturing an optical device comprising the steps of: injection moulding a lens barrel part comprising a first coupling formation, the lens barrel part for housing one or more lens elements arranged along an optical axis for focussing an image onto an image plane; injection moulding a support part with the lens barrel part in situ such that a second coupling formation mechanically mated with the first coupling formation is formed therein; and mounting the support part in front of an optical sensor having a sensitivity plane perpendicular to the optical axis, wherein the first and second coupling formations are mechanically mated at a connection plane parallel to the image plane, and at least a rear portion of the lens barrel part extends rearward from the connection plane such that at least one lens element is located between the connection plane and the optical sensor, and wherein forward movement of the connection plane caused by thermal expansion of the support part is compensated by rearward thermal expansion of the rear portion of the lens barrel part for maintaining the image plane substantially coincident with the sensitivity plane.

In this way, an optical device may be formed in a two-step manufacturing process, without needing to glue and align the lens barrel part to the support part. As such, these components may be formed in a pre-aligned manner, such that they function as a unibody design, albeit that two parts are provided. Furthermore, in this way, a high degree of dimensional accuracy may be achieved between the parts, thereby minimising the risk of dust or other particulate matter interfering with the coupling between components.

In embodiments, the step of injection moulding the lens barrel part comprises injection moulding first polymer material, and wherein the step of injection moulding the support part comprises injection moulding a second, different, polymer material. As such, the risk of bonding between surfaces of the lens barrel and support parts is mitigated.

According to a third aspect, there is provided an optical device comprising: a printed circuit board, PCB, comprising an optical sensor having a sensitivity plane; a lens barrel part housing one or more lens elements arranged along an optical axis for focussing an image onto an image plane; and a support part for supporting the lens barrel part in front of the optical sensor, wherein a rear portion of the support part is soldered to the PCB and the lens barrel part is glued to a front portion of the support part at a connection plane parallel to the image plane, wherein at least a rear portion of the lens barrel part extends rearward from the connection plane such that at least one lens element is located between the connection plane and the optical sensor, and wherein forward movement of the connection plane caused by thermal expansion of the support part is compensated by rearward thermal expansion of the rear portion of the lens barrel part for maintaining the image plane substantially coincident with the sensitivity plane.

In this way, an alternative solution is provided in which the soldered support part provides a pre-aligned base onto which the lens barrel part may be secured. As such, only a single gluing and alignment step is required for aligning the lens barrel part, which simplifies manufacture, whilst still achieving a high optical performance over a large temperature operating range due to the temperature compensation provided by the lens barrel part.

BRIEF DESCRIPTION OF DRAWINGS

Illustrative embodiments will now be described with reference to the accompanying drawing in which.

DETAILED DESCRIPTION

Figure 1:
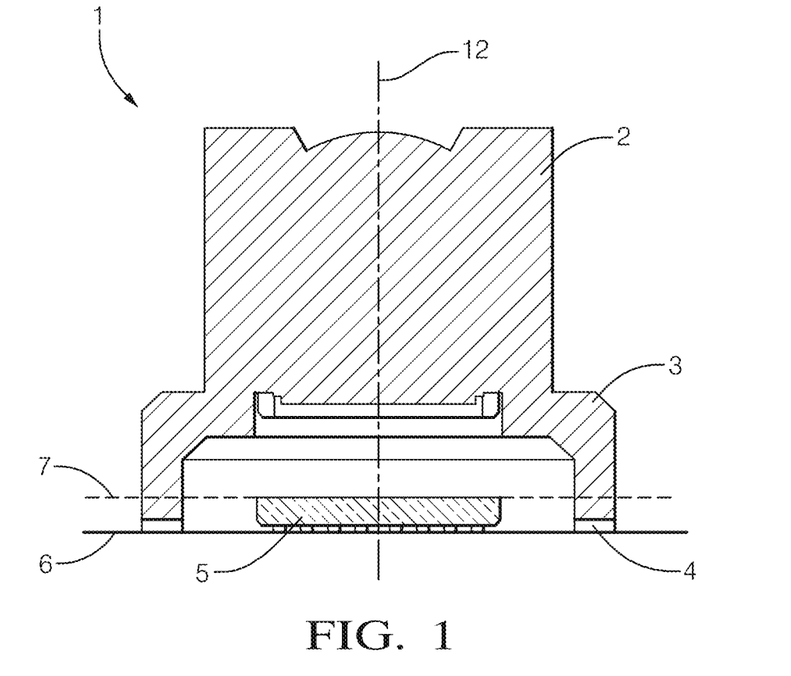
FIG. 1 shows a conventional unibody camera module.

Currently, there are two types of conventional fixed-focus camera modules available for automotive vehicles. One design comprises a lens barrel and lens holder support provided as two separate parts which are glued together, typically using a UV-curable glue. The other design, as shown in FIG. 1, adopts a unibody construction in which the support part 3 is integrated into lens barrel 2 and constitutes one integral piece. In both designs, the support part 3 is fixed to the printed circuit board (PCB) 6 by glue 4, and acts to hold the lens barrel 2 in front of the imager 5 provided at the back of the camera module. The imager 5 has an optical sensor array for detecting a focussed image, with the imager's peak sensitivity occurring across a sensitive plane 7. Typically, the lens barrel 2 and support 3 are made out of metal or plastic material having low thermal expansion coefficient. In designs that employ separate components, it is necessary to pre-align the support 3 to the imager 5 when it is fixed to the PCB. Then, it is also necessary to align the lens barrel 2 when it is fixed to the lens holder such that the image plane, defined by back focal length of the lens barrel 2, is coincident with imager's sensitive plane 7. In the case of unibody lens holder designs, the image plane of the complete assembly, including the stack of optical lenses, is aligned to imager's sensitive plane 7. This is therefore advantageous in that it only requires one alignment and gluing step.

Figure 2:
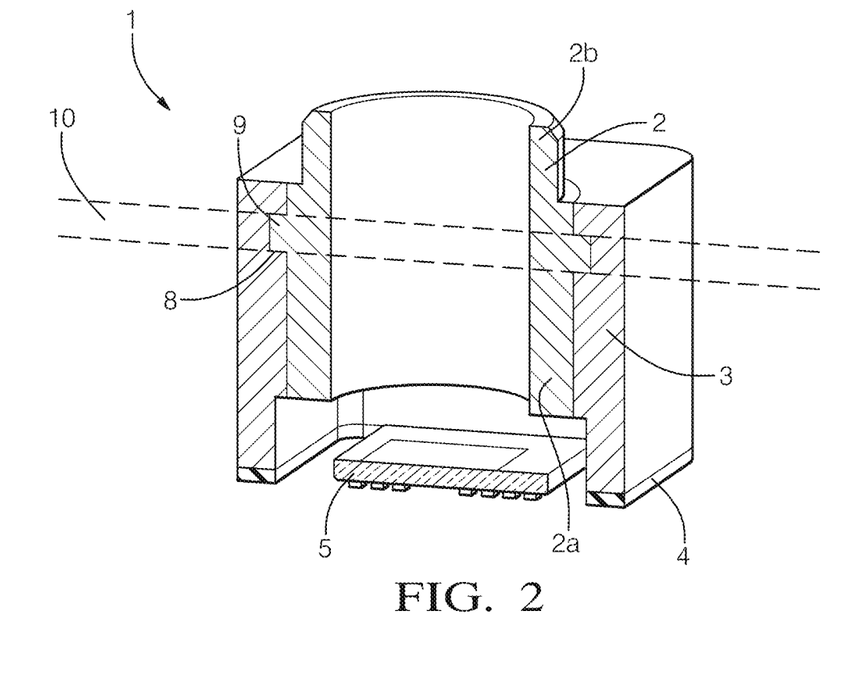
FIG. 2 shows an isometric cross-sectional view of an optical device according to a first embodiment.

FIG. 2 shows an isometric cross-sectional view of an optical device 1 according to a first embodiment. In this embodiment, the optical device 1 is provided as a camera module, with the rear of the camera module at the bottom and the front of the camera module at the top, facing upwards. In FIG. 2, the lens barrel 2 is shown without the lens stack of optical elements for simplicity, but it will be understood that light enters the front of the camera module 1, from where it passes through the lens barrel 2 and is focussed on the imager 5.

The lens barrel 2 is supported within a central bore of a support 3 or carrier such that it is held above the imager 5. The base of the support 3 is secured to a PCB via a UV curable glue 4. The lens barrel 2 is provided with a circumferential projection 9 which extends radially out from the lateral surface of the barrel 2. The projection 9 is received into a corresponding circumferential slot 8 recessed into the opposing face of the bore of the support 3. To ensure accurate mating between these parts, the assembly may be manufactured by first injection moulding the lens barrel 2 and then injection moulding the support 3 around the lens barrel formation. In other embodiments, the support 3 may be injection moulded first. The polymer materials are selected to minimise the surfaces of these parts bonding with one another during this process. As such, in the resultant assembly, although the projection 9 and the slot 8 are engaged to form a mechanical connection, other contacting surfaces of the two parts are able to move relative to one another.

The projection 9 and the slot 8 couple the lens barrel 2 and the support 3 parts across a connection plane 10 which is perpendicular to the optical axis 12. As such, expansion and contraction of the support 3 acts to move the connection plane 10 forward and back along the optical axis 12, respectively.

The body of the lens barrel 2 extends either side of the connection plane 10, with a rear portion 2a extending toward the imager 5 and a front portion 2b extending toward the front of the camera module. Expansion and contraction of the lens barrel 2 therefore moves the rear portion 2a rearward away from the projection 9, and the front portion 2b forward away the projection 9.

In use, when the ambient temperature increases, the lens elements housed within in the rear portion 2a of the lens barrel 2 are thereby moved rearward (down in FIG. 2) relative to the connection plane 10, as the connection plane 10 itself moves forward. Conversely, when the ambient temperature decreases, lens elements housed within in the rear portion 2a of the lens barrel 2 are thereby moved closer to the connection plane 10, as the connection plane 10 itself moves rearward. Accordingly, the absolute location of the rearmost lens elements relative to the imager 5 may be maintained constant as the operating temperature changes. In embodiments where the back focal length is fixed, this thereby allows the image plane to be maintained substantially coincident with the sensitive plane of the imager 5 to optimise the image quality.

Figure 3:
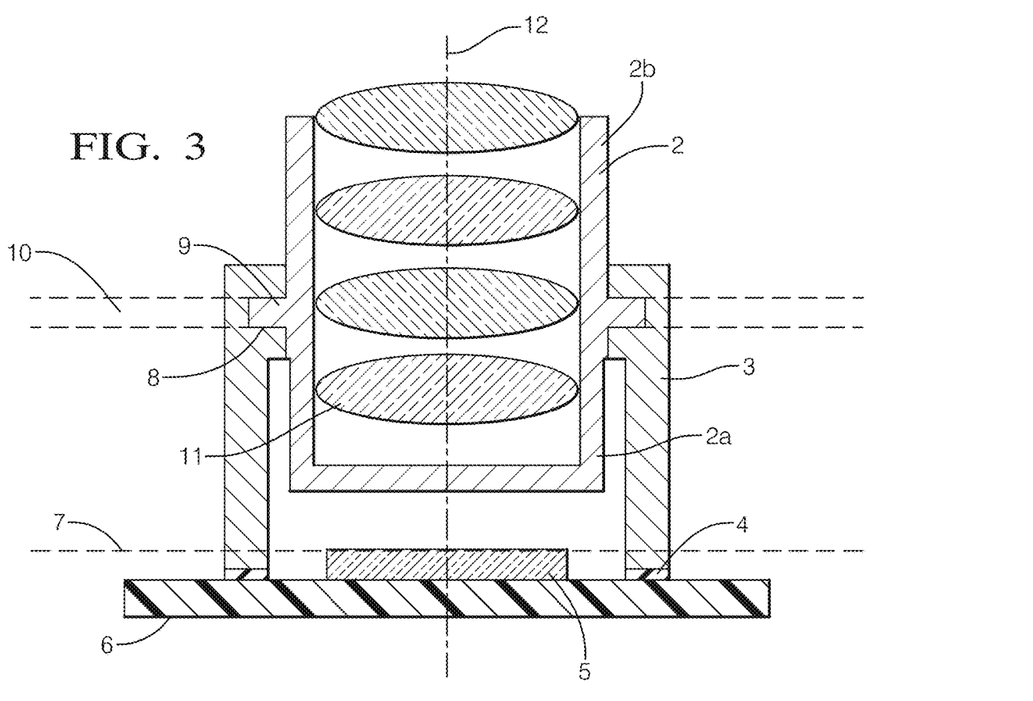
FIG. 3 shows a schematic vertical cross-sectional view through an optical device according to a second embodiment.

FIG. 3 shows a schematic vertical cross-sectional view through an optical device according to a second embodiment. This embodiment is similar to the first embodiment and hence the same reference numerals have been used for like components. In this embodiment, the movement of the rearmost lens elements 11, shown at the bottom of the lens stack in FIG. 3, compensates for both the movement of the connection plane 10 along the optical axis 12 and the movement of the lens elements ahead of the connection plane 10. This is because this embodiment incorporates a longer front portion 2b of the lens barrel 2. The back focal length may therefore change as the spacing of the lens elements within the lens barrel 2 changes. Nevertheless, any change in back focal length may be compensated by movement of the rear portion 2a at the same time as compensating for the forward movement of the connection plane 10. Furthermore, in this embodiment, gap is provided between the rear portion 2a and the opposing face of the support part 3 to allow for relative movement between these components.

Figure 4A:
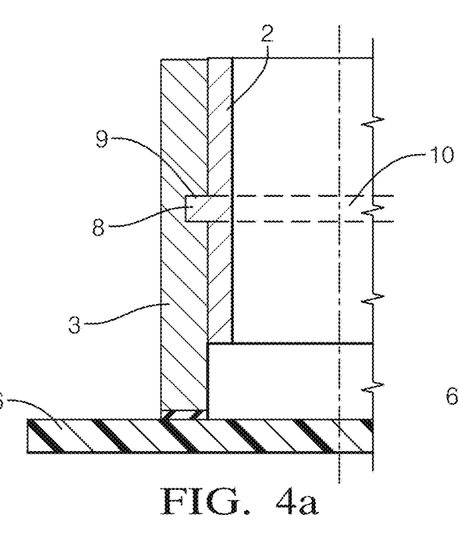
FIGS. 4(a) and (b) show vertical cross-sectional views through alternative configurations of the lens holder.
Figure 4B:
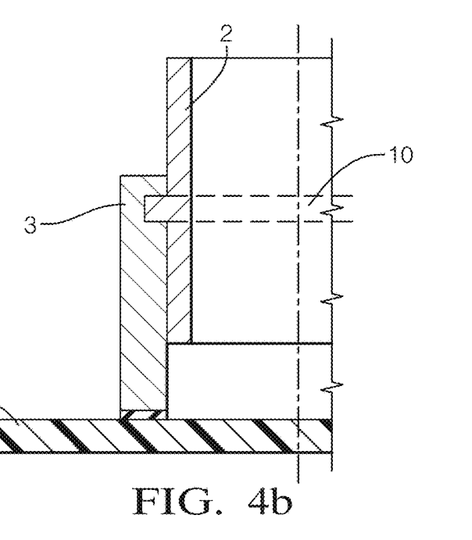

FIGS. 4(a) and (b) show vertical cross-sectional views through alternative configurations of the lens holder, in which both longer (FIG. 4(a)) and shorter (FIG. 4(b)) support parts 3 are provided. This allows for design flexibility, whilst the control factor for temperature compensation is defined by the plane of connection 10, as determined by the axial position of the projection 9 and slot 8.

Figure 5:
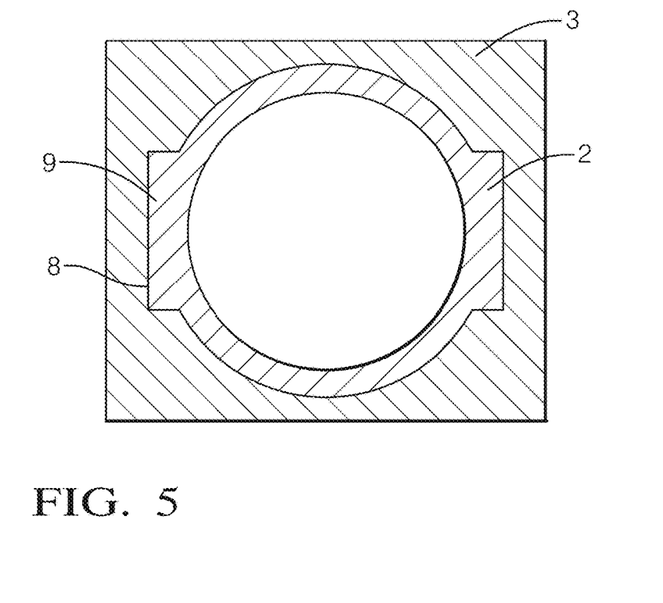
FIG. 5 shows a horizontal cross-section through the connection formations according to a further embodiment.

FIG. 5 shows a horizontal cross-section through the connection formations according to a further embodiment. In this embodiment, the lens barrel 2 comprises two projections 9 which extend laterally from the optical axis 12 to form two flanges. The support formation 3 is provided with two corresponding slots 8 for receiving the projections 8. Advantageously, this arrangement allows for a compact design footprint by not coupling the parts around their entire circumference. Furthermore, by reducing the points of contact between the parts, contact sticking between components can be minimised.

Figure 6A:
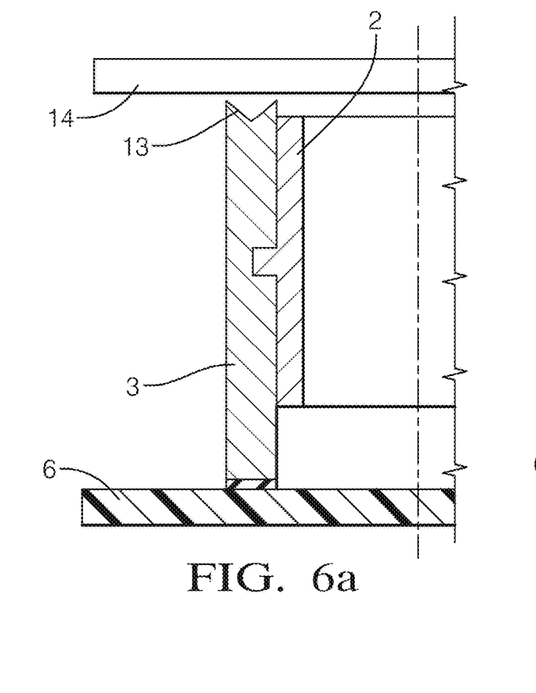
FIGS. 6(a) and (b) show vertical cross-sectional views through further alternative configurations of the lens holder.
Figure 6B:
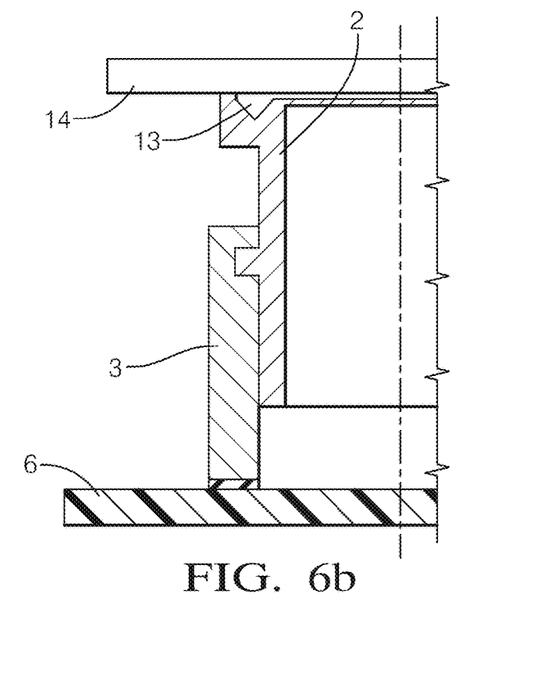

FIGS. 6(a) and (b) show vertical cross-sectional views through further alternative configurations of the lens holder in which a cross-talk prevention formation 13 is provided. In particular, such camera modules are often provided adjacent to a light source for illuminating the camera module's target.

However, the proximity of such a light source may lead to cross talk with the camera's sensor where the modules are covered by a window 14, such as an infrared window. To mitigate the problem of crosstalk, a cross-talk prevention formation 13 may be provided, for example, in an extended front face of the support element 3, as shown in FIG. 6(*a*), or in a front face of the lens barrel 2, as shown in FIG. 6(*b*). In both instances, the cross-talk prevention formation 13 may be provided as a V-shaped channel, such that the sides of the channel 13 are perpendicular to incoming reflected light rays from an adjacent source, which have been reflected by the window 14. As such, this light is absorbed or reflected back into the infrared window so as to prevent onward transmission to the optical sensor.

Figure 7:
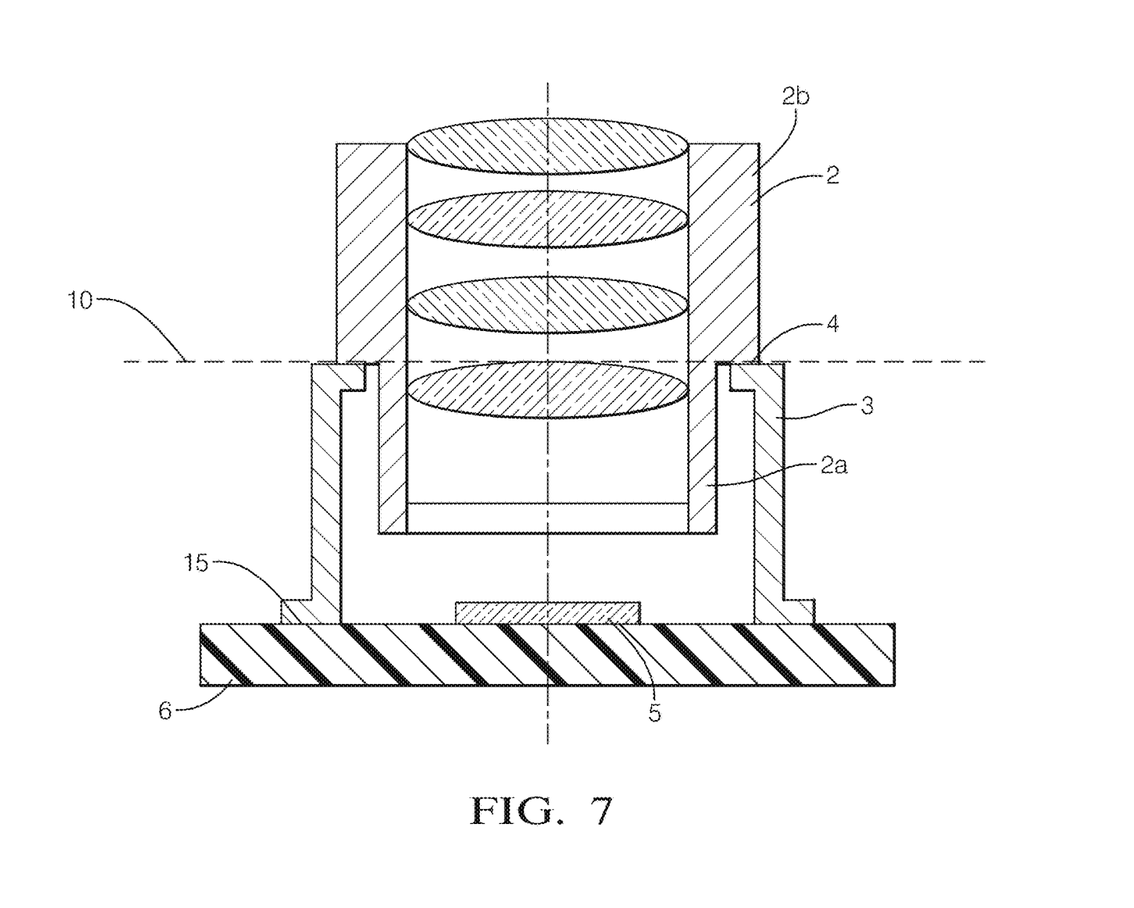
FIG. 7 shows a related optical device which provides an alternative solution to the above problem.

FIG. 7 shows a related optical device which provides an alternative solution to the above problem. In this embodiment, the support part 3 is provided as metal legs which are soldered 15 onto the PCB 6. The lens barrel part 2 is then glued 4 onto a seat provided at the distal ends of the support legs 3. As such, the connection plane 10 is provided at the glued joint 4. As with the above embodiments, the rear portion 2*a* of the lens barrel part 2 extends rearward from the connection plane 10. As such, thermal expansion of the support legs 3 may be compensated by rearward thermal expansion of the rear portion 2*a* of the lens barrel part 2. As such, the image plane may be maintained substantially coincident with the sensitivity plane of the imager 5.

As will be understood, the above described arrangements, thermal compensation may be achieved by the lens barrel part, without the need to provide separate compensation components. This thereby avoids the need for separate gluing and alignment operations. At the same time, a compact optical device assembly may be provided which may achieve high optical performance across a broad operating temperature range.

It will be understood that the embodiments illustrated above show applications only for the purposes of illustration. In practice, embodiments may be applied to many different configurations, the detailed embodiments being straightforward for those skilled in the art to implement.

What is claimed is:

1. A unibody structure comprising:
   a lens barrel comprising a first coupling formation and one or more lens elements arranged along an optical axis, the lens elements being configured to focus an image onto an image plane; and
   a support integrally formed around the lens barrel, the support comprising a base and a second coupling formation mated with the first coupling formation to position the lens barrel at least along the optical axis, the first and second coupling formations defining a connection plane perpendicular to the optical axis,
   wherein at least a first portion of the lens barrel extends from the connection plane in a direction toward the base of the support such that at least one lens element is located between the connection plane and the base of the support, and
   wherein the first portion of the lens barrel is configured to expand toward the base of the support responsive to movement of the connection plane away from the base of the support, the movement being caused by thermal expansion of the support, thereby maintaining a location of the image plane.

2. The device according to claim 1, wherein one of the first and second coupling formations comprises a projection and the other of the first and second coupling formations comprises a recess for receiving the projection.

3. The device according to claim 2, wherein the first coupling formation comprises the projection and the second coupling formation comprises the recess.

4. The device according to claim 2,
   wherein the one of the first and second coupling formations comprising the projection comprises two or more projections extending laterally from the optical axis, and
   wherein the other of the first and second coupling formations comprising the recess comprises two or more slots for receiving the two or more projections.

5. The device according to claim 1, wherein the lens barrel is formed of a first polymer material and the support is formed of a second polymer material different from the first polymer material.

6. The device according to claim 1, wherein the lens barrel is coaxial with a bore defined by the support, and wherein the movement of the first portion of the lens barrel within the bore is toward the base of the support.

7. The device according to claim 1, wherein the one or more lens elements comprises a plurality of lens elements.

8. The device according to claim 7,
   wherein a second portion of the lens barrel extends from the connection plane in the direction away from the base of the support, and
   wherein a thermal expansion induced movement of the first portion of the lens barrel toward the base of the support further compensates for movement away from the base of the support of any of the plurality of lenses retained within the second portion.

9. The device according to claim 1, wherein one of the lens barrel and the support comprises a channel facing away from the base of the support, the channel configured to be located adjacent to a window formed of a transparent material overlaying and positioned proximate to a second portion of the lens barrel.

10. The device according to claim 9, wherein the channel comprises a surface configured to be perpendicular to a direction of incoming light reflected by the window.

11. The device according to claim 1, wherein the lens barrel is formed of a first material with a first thermal expansion coefficient and the support is formed of a second material with a second thermal expansion coefficient different from the first thermal expansion coefficient.

12. A method of manufacturing a device comprising:
   forming a unibody structure by:
      injection molding a lens barrel comprising a first coupling formation, the lens barrel configured to retain one or more lens elements along an optical axis; and
      injection molding a support integrally around the lens barrel such that a second coupling formation in the support is mated with the first coupling formation to position the lens barrel relative to the support at least along the optical axis; and
   mounting the unibody structure in a field of view of an optical sensor having a sensitivity plane, the unibody structure being positioned such that the optical axis is substantially centered on the sensitivity plane,
   wherein a connection plane defined by the first and second coupling formations is parallel to the sensitivity plane, and at least a first portion of the lens barrel extends from the connection plane in a direction toward the optical sensor such that at least one lens element is located between the connection plane and the optical sensor, and
   wherein the first portion of the lens barrel is configured to expand in the direction toward the optical sensor responsive to movement of the connection plane away from the optical sensor caused by thermal expansion of the support, thereby maintaining the image plane substantially coincident with the sensitivity plane.

13. The method according to claim 12,
wherein injection molding the lens barrel comprises injection molding the lens barrel using a first polymer material, and
wherein injection molding the support comprises injection molding the support using a second polymer material different from the first polymer material.

14. The method according to claim 12, wherein one of the first and second coupling formations comprises a projection and the other of the first and second coupling formations comprises a recess for receiving the projection.

15. The method according to claim 14, wherein the first coupling formation comprises the projection and the second coupling formation comprises the recess.

16. The method according to claim 14, wherein the one of the first and second coupling formations comprising the projection comprises two or more projections extending laterally from the optical axis and the other of the first and second coupling formations comprising the recess comprises two or more slots for receiving the two or more projections, respectively.

17. The method according to claim 12, wherein one of the lens barrel and the support comprises a channel facing away from the optical sensor, the channel configured to be located adjacent to a window formed of a transparent material overlaying and positioned proximate to a second portion of the lens barrel.

18. The method according to claim 17, wherein the channel comprises a surface perpendicular to a direction of incoming light reflected by the window.

19. A device comprising:
a printed circuit board (PCB) comprising an optical sensor having a sensitivity plane;
a unibody structure comprising:
a lens barrel comprising one or more lens elements arranged along an optical axis, the lens elements being configured to focus an image onto an image plane; and
a support integrally formed around the lens barrel and configured to retain the lens barrel in a field of view of the optical sensor,
wherein a first end of the support is bonded to the PCB and a connection plane of the unibody structure is parallel to the sensitivity plane,
and wherein at least a first portion of the lens barrel extends from the connection plane in a direction toward the optical sensor such that at least one lens element is located between the connection plane and the optical sensor,
and wherein the first portion of the lens barrel is configured to expand in the direction toward the optical sensor responsive to movement of the connection plane away from the optical sensor, the movement being caused by thermal expansion of the support, thereby maintaining the image plane substantially coincident with the sensitivity plane.

20. The device of claim 19, wherein the support is injected molded around the lens barrel.

* * * * *